United States Patent
Lin et al.

(10) Patent No.: US 10,524,256 B2
(45) Date of Patent: Dec. 31, 2019

(54) METHOD OF ADAPTIVE TTI TUNING

(71) Applicant: MEDIATEK INC., Hsinchu (TW)

(72) Inventors: Guan-Yu Lin, Nantou County (TW); Per Johan Mikael Johansson, Kungsangen (SE); Pavan Santhana Krishna Nuggehalli, Mountain View, CA (US); Chia-Chun Hsu, New Taipei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/473,844

(22) Filed: Mar. 30, 2017

(65) Prior Publication Data

US 2017/0290005 A1 Oct. 5, 2017

Related U.S. Application Data

(60) Provisional application No. 62/316,612, filed on Apr. 1, 2016.

(51) Int. Cl.
*H04L 29/06* (2006.01)
*H04W 72/04* (2009.01)
(Continued)

(52) U.S. Cl.
CPC ....... *H04W 72/0446* (2013.01); *H04L 47/193* (2013.01); *H04L 47/28* (2013.01);
(Continued)

(58) Field of Classification Search
CPC ..................................... H04L 69/16
See application file for complete search history.

(56) References Cited

U.S. PATENT DOCUMENTS

| 2003/0223360 A1* | 12/2003 | Yamazaki | H04W 28/06 370/229 |
| 2005/0088972 A1* | 4/2005 | Zhang | H04L 47/10 370/235 |

(Continued)

FOREIGN PATENT DOCUMENTS

| CN | 101141178 A | 9/2006 |
| CN | 104429140 A | 7/2012 |
| CN | 104967635 A | 5/2014 |

OTHER PUBLICATIONS

International Search Report and Written Opinion of International Search Authority for PCT/CN2017/078990 dated Jun. 23, 2017 (11 pages).

(Continued)

*Primary Examiner* — Ayanah S George
(74) *Attorney, Agent, or Firm* — Oblon, McClelland, Maier & Neustadt, L.L.P.

(57) ABSTRACT

A method of adaptive transmission time interval (TTI) tuning based on TCP information is proposed. First, a procedure for TCP information delivery between eNB and TCP sender/TCP receiver is disclosed. The TCP information comprises TCP status, TCP congestion window (CWND) size, TCP round trip delay, TCP SS threshold, TCP index, and TCP event indication. Second, various methods for eNB to configure TTI with UE TCP information and/or buffer information are disclosed. A first method is saturation detection which includes buffer status based saturation detection and CWND based saturation detection. A second method is Greedy Buffer Clearing. A third method is TCP state based TTI selection method.

19 Claims, 5 Drawing Sheets

(51) Int. Cl.
  *H04W 24/08* (2009.01)
  *H04W 24/10* (2009.01)
  *H04L 12/801* (2013.01)
  *H04L 12/841* (2013.01)
  *H04L 12/835* (2013.01)
  *H04W 72/12* (2009.01)

(52) U.S. Cl.
  CPC ............ *H04L 47/283* (2013.01); *H04L 47/30* (2013.01); *H04L 47/37* (2013.01); *H04L 69/16* (2013.01); *H04L 69/163* (2013.01); *H04W 24/08* (2013.01); *H04W 24/10* (2013.01); *H04W 72/0406* (2013.01); *H04W 72/1226* (2013.01)

(56) References Cited

U.S. PATENT DOCUMENTS

| | | | | |
|---|---|---|---|---|
| 2006/0050640 | A1* | 3/2006 | Jin | H04L 47/10 370/235 |
| 2009/0310553 | A1* | 12/2009 | Kim | H04W 72/085 370/329 |
| 2010/0311433 | A1* | 12/2010 | Lindskog | H04W 72/1242 455/450 |
| 2012/0147750 | A1* | 6/2012 | Pelletier | H04L 47/12 370/235 |
| 2013/0003548 | A1* | 1/2013 | Sridhar | H04L 47/125 370/235 |
| 2013/0121147 | A1* | 5/2013 | Tapia | H04W 28/0289 370/230 |
| 2013/0170358 | A1 | 7/2013 | Chen et al. | |
| 2013/0244590 | A1* | 9/2013 | Nukala | H04W 80/06 455/77 |
| 2014/0233391 | A1* | 8/2014 | Reider | H04W 52/0212 370/236 |
| 2014/0286256 | A1* | 9/2014 | Chowdhury | H04L 47/56 370/329 |
| 2015/0163809 | A1 | 6/2015 | Inaida | 370/230 |

OTHER PUBLICATIONS

3GPP TR 36.881 V0.6.0, Feb. 28, 2016, section 9, 3rd Generation Partnership Project; Technical Specification Group Radio access Network; Evolved Universal Terrestrial Radio Access (E-ITRA); Study on latency reduction techniques for LTE (Release 13).
3GPP TSG-RAN WG2 Meeting #90 R2-152174, Intel Corp., Impact of latency reduction on TCP slow-start behavior, Fukuoka, Japan dated May 25-29, 2015 (6 pages).
3GPP TSG-RAN WG2 #91 R2-153493, Ericsson, Study of shorter TTI for latency reduction, Beijing, China dated Aug. 24-28, 2015 (5 pages).
Taiwan IPO, Search Report for the TW application 106111060 (no English translation is available) dated May 31, 2018 (10 pages).
European Office Action dated Aug. 13, 2019 in European Application No. 17773297.1, 12 pages.

* cited by examiner

METHOD OF ADAPTIVE TTI TUNING

CROSS REFERENCE TO RELATED APPLICATIONS

This application claims priority under 35 U.S.C. § 119 from U.S. Provisional Application No. 62/316,612 entitled "A Method of Adaptive TTI Tuning" filed on Apr. 1, 2016, the subject matter of which is incorporated herein by reference.

TECHNICAL FIELD

The disclosed embodiments relate generally to wireless communication, and, more particularly, to adaptive transmission time interval (TTI) tuning.

BACKGROUND

Long Term Evolution (LTE), commonly marketed as 4G LTE, is a standard for wireless communication of high-speed data for mobile phones and data terminals. LTE is based on Global System for Mobile Communications (GSM) and Universal Mobile Telecommunication System (UMTS) technologies that provides higher data rate, lower latency and improved system capacity. In LTE systems, an evolved universal terrestrial radio access network (E-UTRAN) includes a plurality of base stations, referred as evolved NodeBs (eNBs), communicating with a plurality of mobile stations, referred as user equipments (UEs).

In LTE Release-14, the study of Latency and Reduction technique is conducted. Among the conclusions, it was observed that reducing transmission time interval (TTI) and processing time can significantly reduce the user plane Uu latency, and improve TCP throughput. For example, to further reduce file transfer delay, the concept of shorten TTI is introduced to enhance TCP throughput. The initial throughput of a TCP connection is upper bounded by a congestion window size (CWND). The growing speed of the CWND is determined by TCP round trip time (RTT), i.e., the time interval length between when a TCP server sends a TCP segment (packet) and when the TCP server receives a TCP acknowledgement (TCP ACK) corresponding to the transmitted TCP segment (packet). By applying a shorter TTI, we can have a shorter HARQ RTT and a shorter TCP RTT, causing a higher CWND growing speed and thus a larger TCP initial throughput.

Short TTI, however, has more overhead than legacy TTI, caused by Layer 1 overhead for Physical downlink control channel (PDCCH) and Layer 2 overhead for HARQ process and packet segmentation. Due to more overhead, the delay reduction gain from short TTI depends on different scenarios. In general, shorter TTI may bring little or even negative delay reduction gain in unsuitable scenarios including low Uu throughput, large file size, long backhaul delay, large L1/L2 overhead for short TTI, and low TCP slow-start threshold.

As a result, dynamic TTI switching is desired, and a UE can be dynamically (with a subframe to subframe granularity) scheduled with legacy TTI unicast physical downlink shared channel (PDSCH) and/or short TTI unicast PDSCH. However, eNodeB has no necessary information to judge whether the considered scenario is suitable for short TTI configuration. Without decision-making information, eNodeB cannot optimize TTI selection to reduce latency and enhance throughput.

A solution is sought.

SUMMARY

A method of adaptive transmission time interval (TTI) tuning based on TCP information is proposed. First, a procedure for TCP information delivery between eNB and TCP sender/TCP receiver is disclosed. The TCP information comprises TCP status, TCP congestion window (CWND) size, TCP round trip delay, TCP slow start threshold, TCP index, and TCP event indication. Second, various methods for eNB to configure TTI with UE TCP information and/or buffer information are disclosed. A first method is saturation detection which includes buffer status based saturation detection and CWND based saturation detection. A second method is Greedy Buffer Clearing. A third method is TCP state based TTI selection method.

In one embodiment, a user equipment (UE) establishes a transmission control protocol (TCP) connection with a TCP server in a wireless network. The UE is served by a base station. The UE collects TCP information associated with the TCP connection. The TCP information comprises at least one of a TCP status, a TCP congestion window (CWND) size, and a TCP round trip delay. The UE reports the collected TCP information to the base station. Based on reported TCP information, the base station decides the suitable TTI size and then the scheduled downlink resource for TCP transmission of the UE is one decided TTI size long, i.e., each of scheduled downlink resource block has a time interval length equal to the decided TTI size. The UE can initiate the TCP information reporting periodically or it can be triggered by special TCP events.

In another embodiment, a base station performs data transmission and reception over a transmission control protocol (TCP) connection established between a TCP server and a user equipment (UE) in a wireless network. The base station receives TCP information associated with the TCP connection, wherein the TCP information comprises at least one of a TCP status, a TCP congestion window (CWND) size, and a TCP round trip delay. The base station determines a transmission time interval (TTI) size based on the received TCP information. Based on reported TCP information, the base station decides the suitable TTI size and then schedules downlink resource for TCP transmission of the UE is one decided TTI size long, i.e., each unit of downlink resource block has a time interval length equal to the decided TTI size. The eNB can initiate the TCP information by sending a TCP request indicating required TCP information.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
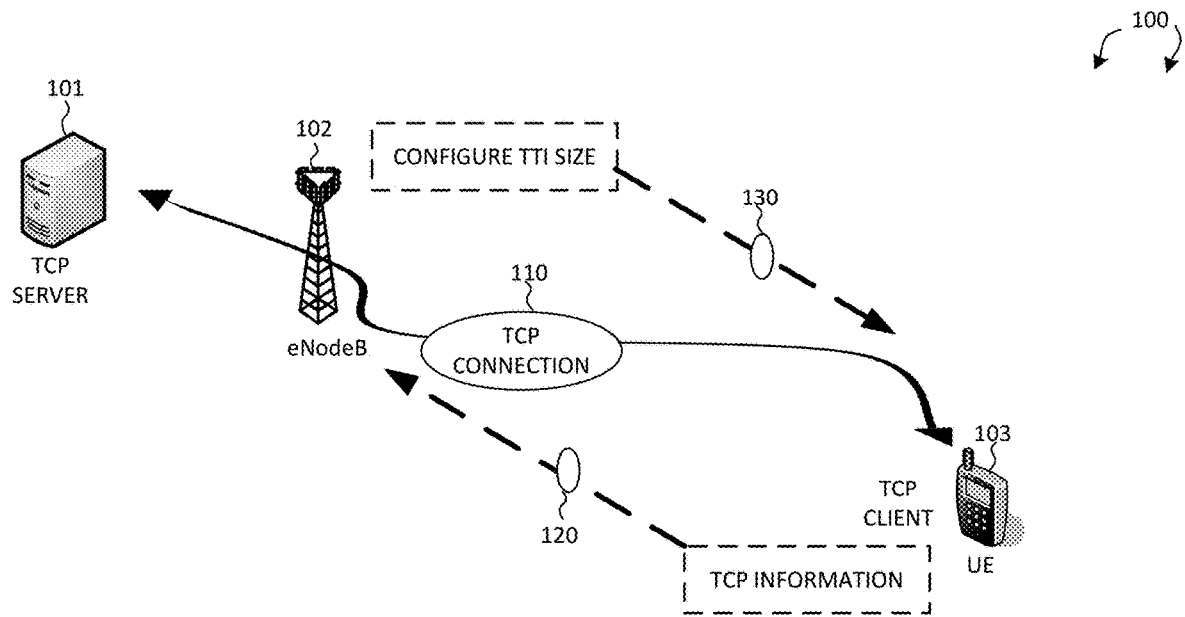
FIG. 1 illustrates a system diagram of a wireless network having a base station and a user equipment (UE) supporting adaptive transmission time interval (TTI) in accordance with embodiments of the current invention.

FIG. 1 illustrates a system diagram of a wireless network 100 having a base station and a user equipment (UE) supporting adaptive transmission time interval (TTI) in accordance with embodiments of the current invention. Wireless network 100 comprises a TCP server 101, a base station eNB 102 that provides LTE cellular radio access via E-UTRAN, and a user equipment UE 103. From the application layer perspective, TCP server provides application services to UE 103, which is also a TCP client. For example, a TCP connection 110 is established between TCP server 101 and TCP client 103 through the serving base station eNB 102, which provides data forwarding from the TCP server to the TCP client (Downlink) and from the TCP client to the TCP server (Uplink).

It was observed that reducing transmission time interval (TTI) and processing time can significantly reduce the user plane (Uu) latency, and improve TCP throughput. However, shorter TTI has more overhead than legacy TTI. Due to more overhead, the delay reduction gain resulted from short TTI depends on different scenarios. Dynamic TTI switching is thus desired to optimize TTI selection based on each scenario. UE can be dynamically (with a subframe to subframe granularity) scheduled with legacy TTI unicast physical downlink shared channel (PDSCH) and/or short TTI unicast PDSCH depending on a considered scenario. However, eNodeB has no necessary information to judge whether the considered scenario is suitable for short TTI configuration to reduce latency and enhance throughput.

In accordance with a novel aspect, a method to assist eNB optimize per-UE TTI for user plane latency reduction is proposed. First, a procedure for TCP information delivery between eNB and TCP sender/TCP receiver is disclosed. Upon a TCP connection, TCP information is reported from UE 103 to eNB 102 based on a UE-initiated or a BS-initiated procedure (step 120). The TCP information comprises TCP status, TCP congestion window (CWND) size, TCP round trip delay, TCP slow start threshold, TCP index, and TCP event indication. Second, various methods for eNB to determine TTI with UE TCP information and/or buffer information are disclosed. A first method is saturation detection which includes buffer status based saturation detection and CWND based saturation detection. A second method is Greedy Buffer Clearing. A third method is TCP state based TTI selection method. After determining the updated TTI, eNB 102 configures the new TTI to UE 103 (step 130).

Figure 2:
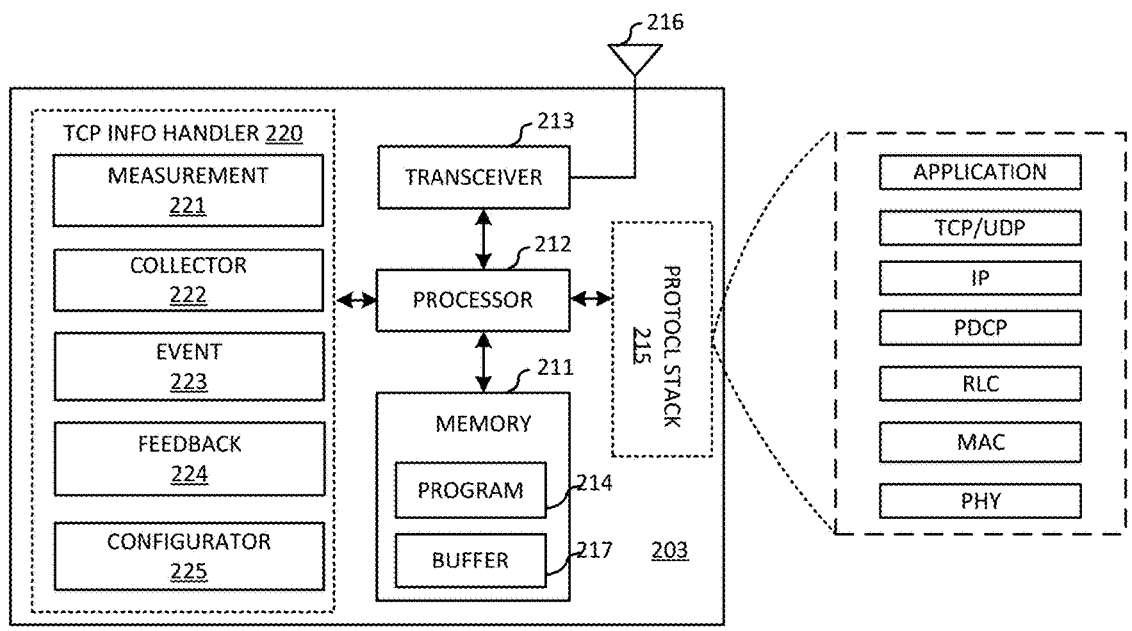
FIG. 2 illustrates simplified block diagram of a user equipment (UE) in accordance with embodiments of the current invention.

FIG. 2 illustrates simplified block diagram of a user equipment UE 203 in accordance with embodiments of the current invention. UE 203 has radio frequency (RF) transceiver module 213, coupled with antenna 216 receives RF signals from antenna 216, converts them to baseband signals and sends them to processor 212. RF transceiver 213 also converts received baseband signals from the processor 212, converts them to RF signals, and sends out to antenna 216. Processor 212 processes the received baseband signals and invokes different functional modules to perform features in UE 203. Memory 211 stores program instructions and data 214 and buffer 217 to control the operations of UE 203.

UE 203 also includes multiple function modules and circuits that carry out different tasks in accordance with embodiments of the current invention. UE 203 includes a TCP information handler 220, which further comprises a measurement module 221, a collector 222, an event handler 223, a feedback module 224, and a configuration module 225. In one example, the measurement module 221 performs measurements including TCP round trip delay. Collector 222 collects TCP information for each TCP connection. Event handler 223 detects special events related to TCP information reporting. Feedback circuit 224 provides TCP information either periodically or based on special events. Configurator 225 configures various configuration including measurement, feedback, and TTI tuning. UE 203 further includes a protocol stack 215, which further comprises different layers including PHY, MAC, RLC, PDCP, TCP/UDP, and Application layer.

Figure 3:
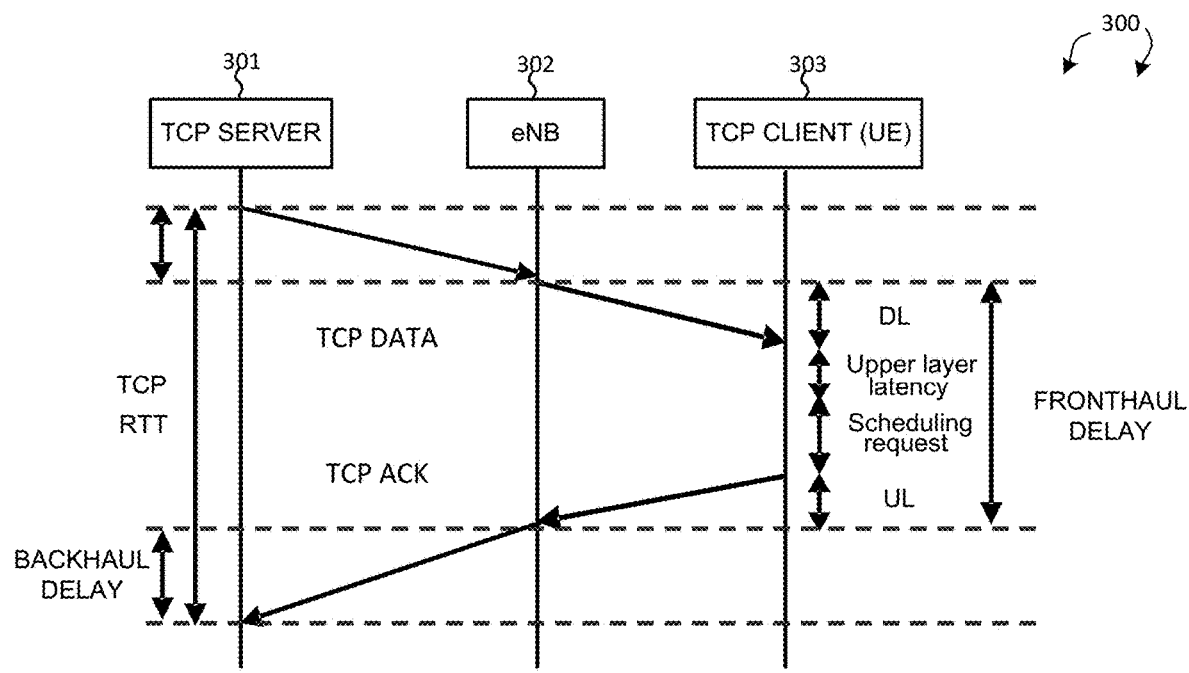
FIG. 3 illustrates the relation of round trip time delay (RTT), front-haul delay, and backhaul delay for TCP data/ack transmission.

FIG. 3 illustrates the relation of round trip time delay (RTT), front-haul delay, and backhaul delay for TCP data/ack transmission in a wireless network 300. Wireless network 300 comprises a TCP server 301, a base station eNB 302, and a TCP client UE 303. TCP throughput is bounded by congestion window (CWND) size or by the maximum air interface capability. In general, TCP throughput is reversely proportional to the TCP round trip time (RTT). As depicted in FIG. 3, the TCP RTT comprises back haul delay and front haul delay. Front haul delay further comprises DL transmission time from eNB 302 to UE 303, upper layer latency, scheduling request, and UL transmission time from UE 303 to eNB 302. Shorter TTI causes shorter TCP RTT because the time for DL transmission, processing, and UL transmission during air interface is reduced. Shorter TCP RTT in turn enables faster growing speed of CWND, which control the maximum TCP throughput if TCP throughput is bounded by CWND.

Short TTI, however, has more overhead than legacy TTI, caused by Layer 1 overhead for Physical downlink control channel (PDCCH) and Layer 2 overhead for Hybrid ARQ (HARQ) process and packet segmentation. Due to more overhead, delay reduction gain from short TTI depends on different scenarios. In general, shorter TTI may bring little or even negative delay reduction gain in unsuitable scenarios including low Uu throughput, large file size, long backhaul delay, large L1/L2 overhead for short TTI, and low slow-start threshold.

Figure 4:
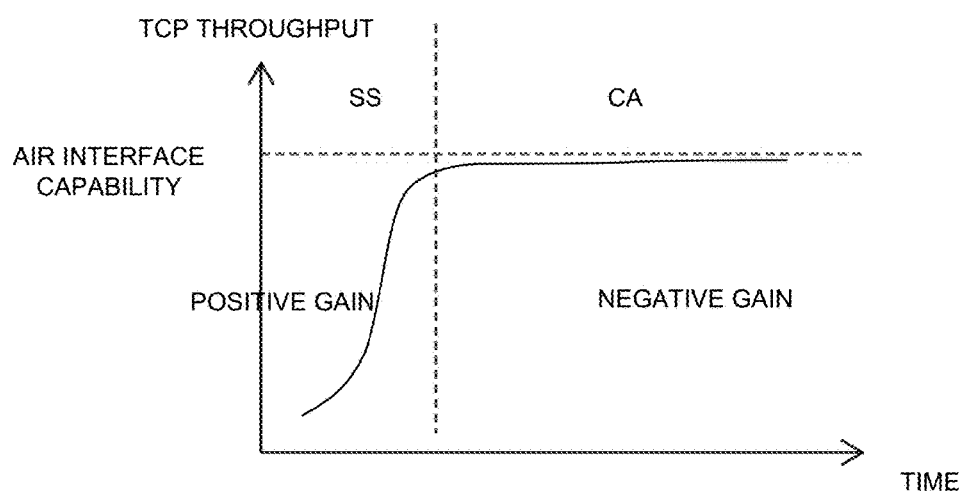
FIG. 4 illustrates TCP throughput with respect to UE state.

FIG. 4 illustrates TCP throughput with respect to UE state and CWND size. Whether shortened TTI can reduce latency is uncertain. TCP throughput is bounded by congestion window (CWND) size or by the maximum air interface capability. For slow start (SS) state, CWND grows exponentially with the TCP ACK receiving rate. For congestion avoidance (CA) state, CWND grows linearly with the TCP ACK receiving rate. As depicted in FIG. 4, if the UE is in slow start (SS) state, TCP throughput is growing and bounded by CWND. As a result, applying shorter TTI could reduce RTT, causing boosted CWND and throughput. On the other hand, if the UE is in congestion avoidance (CA) state, TCP throughput is saturated and bounded by the air interface capability. As a result, applying short TTI has more overhead, causing lower resource utilization and lower TCP throughput. Therefore, whether shortened TTI can reduce latency and improve throughput is closely related to UE state as well.

In accordance with one novel aspect, a dynamic TTI switching is proposed, and a UE can be dynamically (with a subframe to subframe granularity) scheduled with legacy TTI unicast physical downlink shared channel (PDSCH) and/or short TTI unicast PDSCH. Furthermore, such TTI switching is determined by the base station based on TCP information to judge whether the considered scenario is suitable for short TTI configuration. The TCP information is collected by the TCP client (UE) and then reported by the UE autonomously or under request.

Figure 5:
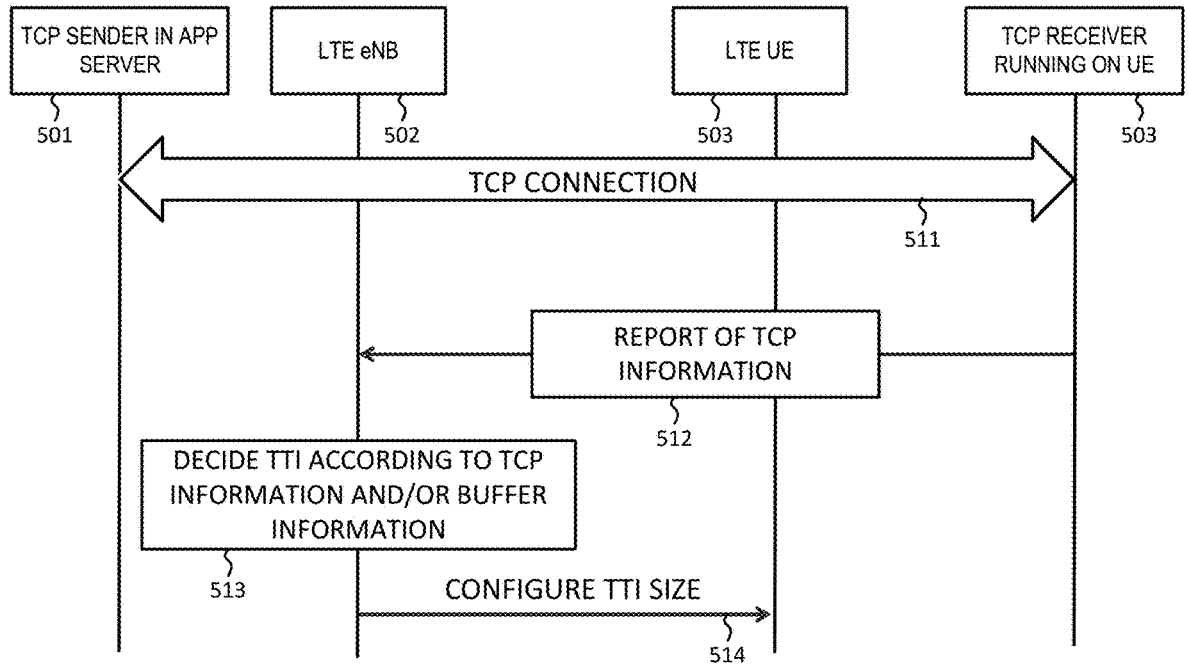
FIG. 5 illustrates a first embodiment of UE-initiated TCP information reporting and adaptive TTI tuning.

FIG. 5 illustrates a first embodiment of UE-initiated TCP information reporting and adaptive TTI tuning in a wireless communication network. In step 511, a TCP client UE 503 established a TCP connection with a TCP server 501 through its serving base station eNB 502. UE 503 collects TCP information of the TCP connection. In step 512, UE 503 reports the collected TCP information to eNB 502. In step 513, eNB 502 determines a new TTI based on the TCP information reported by UE 503 and/or buffer information maintained by eNB 502. In step 514, eNB 502 schedules downlink resource for the UE with the newly determined TTI size on a subframe basis. In one example the UE-initiated TCP information is reported periodically by UE 503. In another example, the UE-initiated TCP information is reported in event-based way, i.e., the report is sent when specific events occur. The specific events may include whether a TCP state of the UE is changed, whether a new TCP connection is set up, or whether the TCP link becomes saturated.

Figure 6:
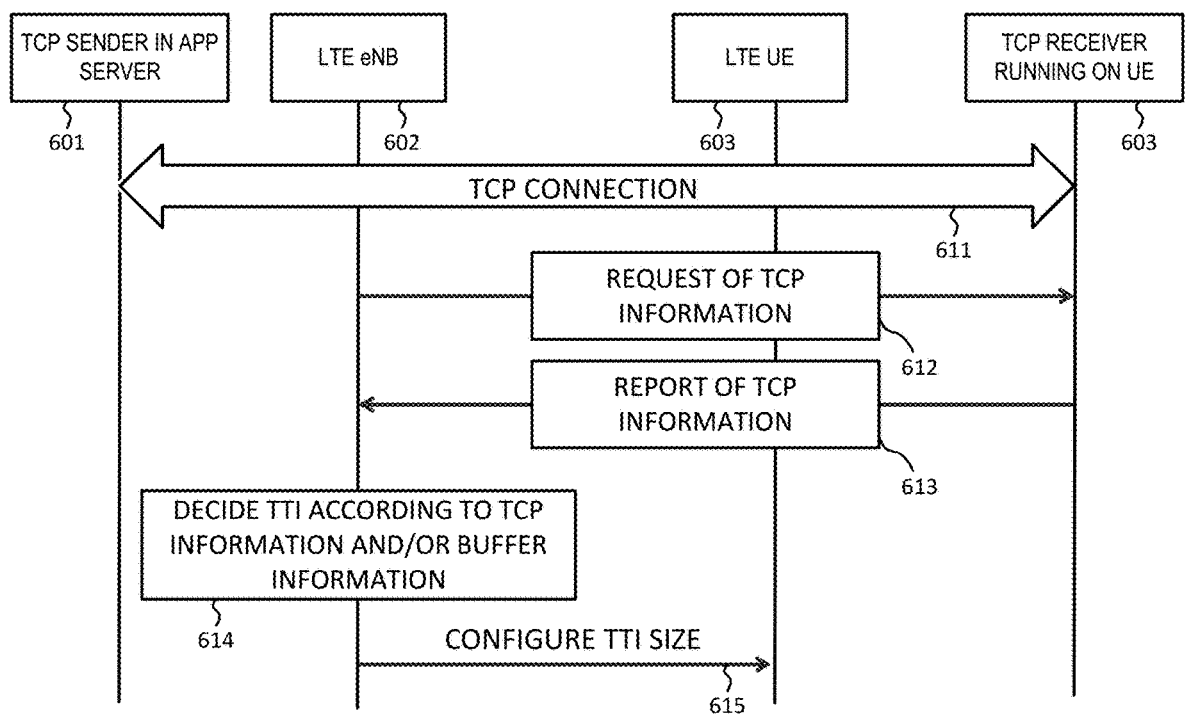
FIG. 6 illustrates a second embodiment of base station initiated TCP information reporting and adaptive TTI tuning.

FIG. 6 illustrates a second embodiment of base station initiated TCP information reporting and adaptive TTI tuning in a wireless communication network. In step 611, a TCP client UE 603 established a TCP connection with a TCP server 601 through its serving base station eNB 602. UE 603 collects TCP information of the TCP connection. In step 612, eNB 602 sends a TCP request to UE 603 for TCP information. The TCP request may specify the required TCP information, e.g., TCP status only or TCP RTT with TCP index. In step 613, UE 603 reports the collected TCP information to eNB 602 in response to the request. In step 614, eNB 602 determines a new TTI based on the TCP information reported by UE 603 and/or buffer information maintained by eNB 602. In step 615, eNB 602 schedules downlink resource for UE 603 with the newly determined TTI size on a subframe basis.

The content of reported TCP information may include the following information: 1) a TCP status—slow start state, congestion avoidance state, fast recovery state, and fast retransmission state; 2) a TCP congestion window size; 3) a TCP round trip delay—can be measured through either TCP RTT estimation or ping; 4) a TCP SS threshold; 5) a TCP index—several TCP connections may be running on the same UE and the TCP index is used to specify which TCP connection the delivered TCP information belongs to; 6) a TCP event indication—indicates whether TCP state switches from SS to CA or indicates whether TCP link becomes saturated, e.g., CWND>(TCP RTT*Uu throughput). The source of the TCP information may be from TCP sender or from TCP receiver. The TCP information delivery can be initiated by the UE periodically or triggered by the TCP event. The TCP information delivery can also be initiated by the eNB by sending a TCP request where the eNB can specify the required TCP information, e.g., the TCP status only, in the TCP request.

Figure 7:
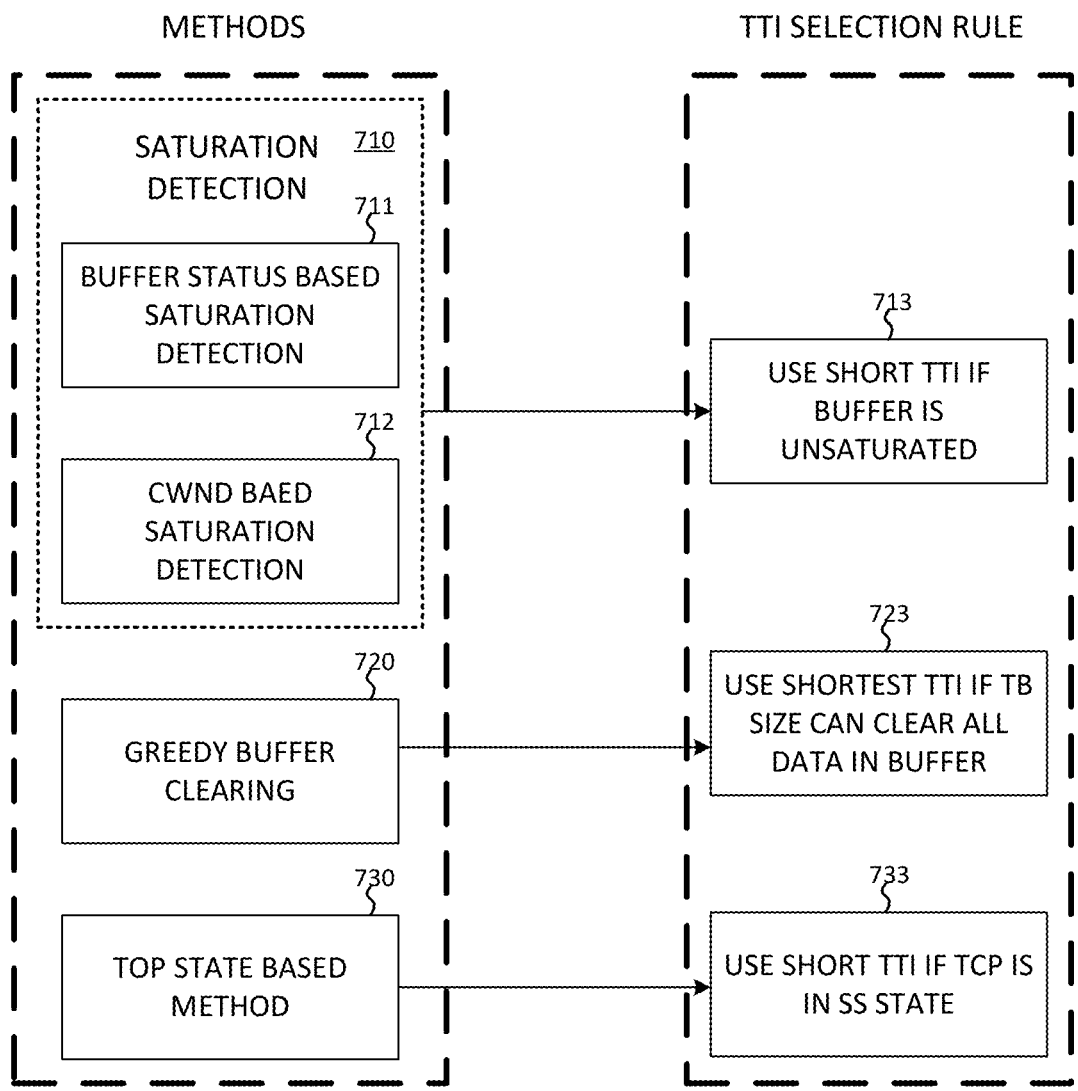
FIG. 7 illustrates different examples of adaptive TTI tuning methods based on TCP information and/or buffer information.

FIG. 7 illustrates different examples of adaptive TTI tuning methods based on TCP information and/or buffer information. There are different methods for eNB to configure TTI with UE reported TCP information and/or buffer information. The first method #1 is saturation detection (710) which includes buffer status based saturation detection (711) and CWND based saturation detection (712). The second method #2 is Greedy Buffer Clearing (720). The third method #3 is TCP state based method (730).

The first method is saturation detection. The serving eNB maintains a UE buffer for each corresponding TCP connection. UE buffer refers to an LTE RLC buffer that is maintained by the eNB for the UE. The UE buffer is saturated if the total bits of TCP packets in the UE buffer cannot be completely transmitted in a TCP round trip delay. For method #1, the eNB uses short TTI when UE buffer is unsaturated, and uses long TTI when UE buffer is saturated (713). This is because TCP throughput is bounded by either CWND or by maximum air-interface capability. If bounded by CWND, UE buffer is empty for a proportion of each TCP round trip delay, waiting for packet arrivals. Using short TTI is more likely to reduce TCP round trip delay, and thus enhance CWND growing speed and TCP throughput. If bounded by maximum air interface throughput, and if UE buffer becomes saturated, then eNB keeps transmitting data to UE for DL scenario in each TCP round trip delay. TCP throughput is then decided by Uu resource utilization rather than CWND or TCP round trip delay. Therefore, long TTI should be used to reduce overhead. Method #1 includes buffer status based saturation detection and CWND based saturation detection.

For buffer status based saturation detection, if the buffer is saturated, then packets will be queued in UE buffer, and thus the eNB should be able to observe an increasing queueing. Therefore, if the number of packets in UE buffer has a non-decreasing and growing trend, then the buffer is saturated. Otherwise, the buffer is unsaturated. In one example, the first order and second order information of number of packets in UE buffer can be used to judge if the buffer is saturated.

For CWND based saturation detection, CWND is the number of TCP packets that can be injected into the network by the TCP sender. In a duration of RTT_min, the maximum bits that can be transmitted by the TCP link is given by Uu throughput *RTT_min, called bandwidth-delay product (BDP). If CWND becomes more than BDP, TCP link remains the maximal achievable throughput, but the TCP round trip delay increases (due to the increasing queueing length). Therefore, the UE buffer is saturated if CWND>RTT_min*Uu throughput. Here, RTT_min is the round-trip delay between the TCP sender and the TCP receiver. For DL scenario, TCP sender is the app server, e.g. web server; and the TCP receiver is running on a UE. RTT_min does not include the queueing delay of TCP packets. RTT_min can be obtained by ping, or approximated with RTT, estimated by a TCP RTT estimation algorithm, e.g., RFC 6298.

The second method is Greedy Buffer Clearing. The concept is to select the shortest TTI whose TB size can clear all the data to be transmitted in UE buffer (723). If UE buffer size is larger than the TB size of the largest TTI, then select the longest TTI. This method aims to clear UE buffer with the shortest consumed time to improve TCP throughput.

The third method is TCP state based method. The concept is to use short TTI if the TCP state is in slow start (SS) state and use long/legacy TTI if the TCP state is in congestion avoidance (CA) state (733). When UE is in SS state, CWND grows exponentially with time. Therefore, using short TTI can boost CWND growth and efficiently increase TCP throughput. On the other hand, when UE is in CA state, CWND grows linearly, so using short TTI has limited gain in increasing CWND. Thus, in CA state it is reasonable to select long or legacy TTI to reduce overhead for high resource utilization.

Figure 8:
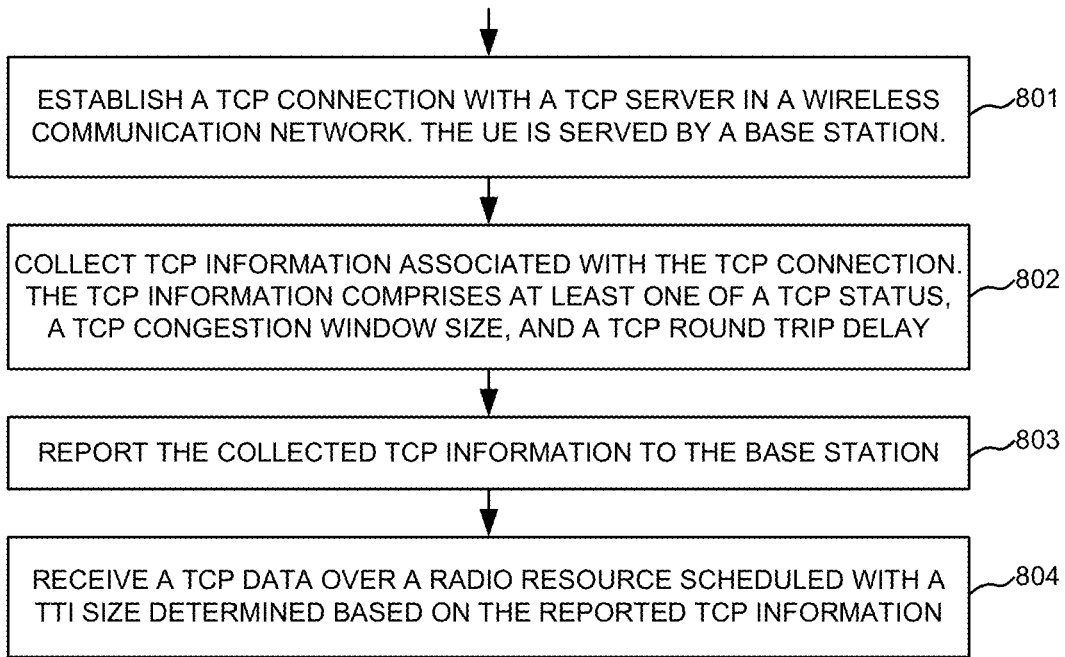
FIG. 8 is a flow chart of a method of adaptive TTI tuning from UE perspective in accordance with one novel aspect.

FIG. 8 is a flow chart of a method of adaptive TTI tuning from UE perspective in accordance with one novel aspect. In step 801, a user equipment (UE) establishes a transmission control protocol (TCP) connection with a TCP server in a wireless network. The UE is served by a base station. In step 802, the UE collects TCP information associated with the TCP connection. The TCP information comprises at least one of a TCP status, a TCP congestion window (CWND) size, and a TCP round trip delay. In step 803, the UE reports the collected TCP information to the base station. In step 804, the UE receives a TCP data over a radio resource scheduled with a time interval length equal to the transmission time interval (TTI) determined based on the reported TCP information.

Figure 9:
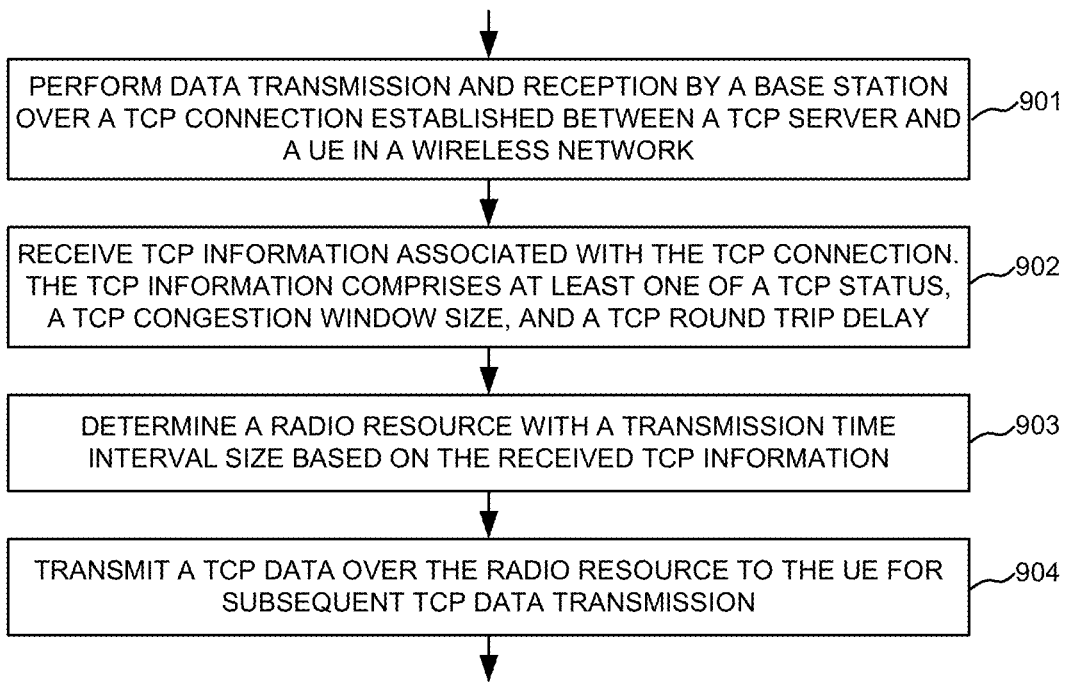
FIG. 9 is a flow chart of a method of adaptive TTI tuning from eNB perspective in accordance with one novel aspect.

FIG. 9 is a flow chart of a method of adaptive TTI tuning from base station perspective in accordance with one novel aspect. In step 901, a base station performs data transmission and reception over a transmission control protocol (TCP) connection established between a TCP server and a user equipment (UE) in a wireless network. In step 902, the base station receives TCP information associated with the TCP connection, wherein the TCP information comprises at least one of a TCP status, a TCP congestion window (CWND) size, and a TCP round trip delay. In step 903, the base station determines a radio resource with a transmission time interval (TTI) size based on the received TCP information. In step 904, the base station schedules each radio resource with one TTI long in time for the UE for subsequent TCP data transmission.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
 establishing a transmission control protocol (TCP) connection with a TCP server;
 collecting TCP information associated with the TCP connection, wherein the TCP information comprises at least two of (i) a TCP status including one of a slow start state, a congestion avoidance state, a fast recovery state, and a fast retransmission state, (ii) a TCP congestion window (CWND) size, and (iii) a TCP round trip delay;
 reporting the collected TCP information to the base station; and
 receiving a TCP data over a radio resource scheduled with a transmission time interval (TTI) determined based on the reported TCP information, wherein the establishing, collecting, reporting and receiving are performed by a user equipment (UE) in a wireless network, and wherein the UE is served by a base station.

2. The method of claim 1, wherein a short TTI size is received if the UE is in the slow start state, and wherein a long TTI size is received if the UE is in another state.

3. The method of claim 1, wherein the TCP CWND is compared with a product of a minimum round trip delay and an expected UE throughput to determine whether a base station maintained UE buffer is saturated.

4. The method of claim 3, wherein a short TTI size is received if the base station maintained UE buffer is unsaturated, and wherein a long TTI size is received if the base station maintained UE buffer is saturated.

5. The method of claim 1, wherein the TCP information is initiated by the UE periodically or triggered by a special event.

6. The method of claim 1, wherein the TCP information is reported in response to a TCP information request from the base station.

7. A user equipment (UE), comprising:
 a transmission control protocol (TCP) layer handling circuit that establishes a TCP connection with a TCP server in a wireless network, wherein the UE is served by a base station;
 a processor that collects TCP information associated with the TCP connection, wherein the TCP information comprises at least two of (i)a TCP status including one of a slow start state, a congestion avoidance state, a fast recovery state, and a fast retransmission state, (ii) a TCP congestion window (CWND) size, and (iii) a TCP round trip delay;
 a transmitter that reports the collected TCP information to the base station; and
 a receiver that receives a TCP data over a radio resource scheduled with a transmission time interval (TTI) determined based on the reported TCP information.

8. The UE of claim 7, wherein a short TTI size is received if the UE is in the slow start state, and wherein a long TTI size is received of the UE is in another state.

9. The UE of claim 7, wherein the TCP CWND size is compared with a product of a minimum round trip delay and an expected UE throughput to determine whether a base station maintained UE buffer is saturated.

10. The UE of claim 9, wherein a short TTI size is received if the base station maintained UE buffer is unsaturated, and wherein a long TTI size is received if the base station maintained UE buffer is saturated.

11. The UE of claim 7, wherein the TCP information is initiated by the UE periodically or triggered by a special event.

12. The UE of claim 7, wherein the TCP information is reported in response to a TCP information request from the base station.

13. A method comprising:
 performing data transmission and reception over a transmission control protocol (TCP) connection established between a TCP server and a user equipment (UE) in a wireless network;
 receiving TCP information associated with the TCP connection, wherein the TCP information comprises at least two of (i)a TCP status including one of a slow start state, a congestion avoidance state, a fast recovery state, and a fast retransmission state, (ii) a TCP congestion window (CWND) size, and (iii) a TCP round trip delay;

determining a radio resource with a transmission time interval (TTI) size based on the received TCP information; and transmitting a TCP data over the radio resource to the UE for subsequent TCP data transmission, wherein the performing, receiving, determining, and transmitting are performed by a base station in a wireless network.

14. The method of claim 13, wherein the TCP CWND size is compared with a product of a minimum round trip delay and an expected UE throughput to determine whether a base station maintained UE buffer is saturated.

15. The method of claim 14, wherein a short TTI size is determined if the base station maintained UE buffer is unsaturated, and wherein a long TTI size is determined if the base station maintained UE buffer is saturated.

16. The method of claim 13, wherein a short TTI size is received if the UE is in the slow start state, and wherein a long TTI size is received of the UE is in another state.

17. The method of claim 13, further comprising:
transmitting a TCP information request to the UE, wherein the TCP information request specifies the required TCP information.

18. The method of claim 1, wherein the TCP information comprises each of (i) the TCP status including one of the slow start state, the congestion avoidance state, the fast recovery state, and the fast retransmission state, (ii) the TCP congestion window (CWND) size, and (iii) the TCP round trip delay.

19. The method of claim 18, wherein the TCP status includes each of the slow start state, the congestion avoidance state, the fast recovery state, and the fast retransmission state.

* * * * *